United States Patent Office 3,222,333
Patented Dec. 7, 1965

3,222,333
POLYMERIZATION PROCESS
Edward W. Duck and Philip M. Duinker, Amsterdam, Netherlands, assignors to Shell Oil Company, New York, N.Y., a corporation of Delaware
No Drawing. Filed Mar. 12, 1962, Ser. No. 179,221
Claims priority, application Netherlands, Mar. 20, 1961, 262,576
10 Claims. (Cl. 260—80.7)

This invention relates to the polymerization and copolymerization of olefinically unsaturated hydrocarbons by means of catalysts related to those of Ziegler.

The invention is important in the copolymerization of ethylene and propylene with each other or of ethylene and/or propylene with one or more higher alpha-olefins or with conjugated or non-conjugated diolefins or polyolefins. It leads in many cases to products with special properties, namely to rubber-like products having an atactic (not sterically regular) structure and low crystallinity. In other cases, namely when starting from butadiene, one can obtain according to the invention polymers which are more crystalline in nature. A particularly outstanding advantage of this invention is that it permits the production of copolymerization products of a multiple number of monomers in which, by appropriate selection of catalyst components, the molecular weight of the total polymer is in a relatively narrow controlled range.

For the purposes of description of this invention a copolymer produced by the simultaneous copolymerization of three monomers will be designated a "terpolymer" and a copolymer produced by simultaneous polymerization of four monomers will be designated a "quaterpolymer."

It is known to produce rubber-like copolymers of ethylene with propylene or with higher alpha-olefins by carrying out the copolymerization in the presence of certain vanadium compounds combined with suitable reducing agents. Vanadium compounds that have been proposed for such use are generally from the group consisting of vanadium halides, e.g., $VCl_3$ and $VCl_4$, canadium oxytrichloride ($VOCl_3$) and trialkyl esters of orthovanadic acid.

A great drawback of these vanadium compounds is that they are very unstable in contact with air, water, dilute acids and dilute alkalis. $VOCl_3$ has the further disadvantage of being corrosive. The orthovanadic alkyl esters are difficult to prepare.

It has now been found that rubbery olefin copolymers can be obtained by using as catalyst components certain non-corrosive, easy-to-prepare, oil-soluble vanadium compounds which are stable to air, water and dilute acids and which are hydrolyzed by dilute alkalis far less rapidly than the vanadyl compounds used heretofore. It has also been found that by proper selection of catalyst components from these oil soluble vanadium compounds and known reducing compounds, such as aluminum alkyls, close control of the copolymerization reaction can be exercised, leading to the production of polymers of relatively narrow molecular weight ranges.

It is an object of this invention to provide novel methods for producing rubbery copolymers of unsaturated compounds.

It is a specific object of this invention to provide an improved method for the production of rubbery copolymers of ethylene and propylene.

Another specific object is to provide an improved method for the production of terpolymers and quaterpolymers of alpha monoolefins and of alpha monoolefins with diolefins.

It is a further object to provide an improved method for controlling the molecular weight range and the average molecular weight of copolymers of two or more alpha monoolefins or of alpha monoolefins with diolefins.

One embodiment of this invention is a process for the polymerization of one or more olefinically unsaturated hydrocarbons by contact with a catalyst which comprises at least one vanadium compound of the type of vanadium complexes of certain aromatic carboxylic acids, namely, acids which are substituted in the aryl nuclei by one or more OH and/or SH groups, and at least one reducing compound.

A preferred embodiment of this invention is a process for the copolymerization of ethylene and propylene by means of catalysts of the type described.

A specially preferred embodiment is a process for the copolymerization, by means of catalysts of the type described, of ethylene and propylene with a third comonomer or third and fourth comonomers, said comonomers being higher alpha-monoolefins and/or diolefins.

MONOMERS

Catalysts of this invention have been successfully used in the homopolymerization of butadiene to lead to a product consisting of 100% trans-1,4-butadiene. The catalysts are not generally suitable, however, for homopolymerization of alpha-monoolefins nor for the homopolymerization of all diolefins.

Catalysts of this invention are very suitable for the copolymerization of ethylene with propylene, and of ethylene, propylene or mixtures of ethylene and propylene with higher alpha-monoolefins or with conjugated or non-conjugated diolefins or with mixtures of higher monoolefins and conjugated or non-conjugated diolefins. Suitable higher monoolefins are linear alpha-olefins, for example those having from 4 to 16 carbon atoms, including butene-1, hexene-1, dodecene-1 and the like; branched alpha-monoolefins in the same carbon number range including 3-methylbutene-1, 4-methylpentene-1, 3-ethylhexene-1, 11-methyldodecene-1 and the like; conjugated diolefin hydrocarbons such as butadiene, isoprene, 1-vinyl-1-cyclohexene; non-conjugated diolefin hydrocarbons such as 1,4-cyclohexene; 11-ethyl-1,11-tridecadiene and 1,9-octadecadiene; trienes, such as trivinylcyclohexane; and polydienes, such as bicyclopentadiene.

As is well known in copolymerization of olefins by Ziegler type catalysts, the proportion each monomer incorporated in the copolymer is a function of monomer concentration in the reaction mass and polymerization rate of the monomer. Moreover concentration in the liquid reaction mass depends on monomer solubility in the reaction solvent and monomer concentration in the gas phase, if gaseous feed is used. It is well known to persons skilled in this art how to adjust monomer concentrations in the feed to obtain a desired ratio in the product. Each monoolefinic comonomer may be present in the polymerization reaction mixture in a wide range of proportions, from 0.5 to 99.5 mol percent. It is generally preferred, however, that the total proportion of combined ethylene and propylene in a reaction mixture containing at least one additional comonomer is over 50 mol percent of the total monomer mass. In gaseous ethylene-propylene feed mixtures, propylene preferably constitutes the major component. When a diolefin is present, it is preferably used in a concentration which results in a product containing from 0.5 to about 5 mol percent of the diolefin, copolymerized with one or more monoolefins. The concentration of diolefin in the reaction mixture is usually relatively low, e.g., between 10 and 100 millimoles per liter, but may be varied outside this range to achieve desired polymer composition.

VANADIUM COMPOUNDS

The vanadium compounds used as part of the catalysts of this invention are complexes which can be readily prepared, for example, by reaction of alkali salts of aromatic carboxylic acids which are further defined below with vanadyl salts in an aqueous medium at room temperature. A complex precipitates during this reaction; it can be separated and purified, such as by extraction and recrystallization, for instance by means of gasoline or benzene.

The aromatic carboxylic acids whose alkali salts are employed in the preparation of the vanadium complexes are substituted in the aryl nucleus by one or more OH and/or SH groups. Particularly preferred are aromatic hydroxy- or mercaptocarboxylic acids which are further substituted in the aromatic nucleus by one or more hydrocarbon radicals. Defined more specifically, the acids are aromatic carboxylic acids having at least one aromatic six carbon ring on which there are disposed at least one carboxyl group (—COOH) and at least one group —XH wherein X represents a chalcogen, preferably sulfur or oxygen. The preferred compounds contain one —COOH and one —XH group, preferably in ortho position to each other. In the preferred compounds, the same aromatic nucleus which contains the —XH and —COOH groups also is substituted with one or more hydrocarbyl groups which preferably are alkyl groups of 1 to 12 carbon atoms and most preferably of 2 to 6 carbon atoms; isopropyl, isobutyl and tertiary butyl groups are especially preferred. The substituted aromatic ring may be attached to one or more other aromatic rings. Preferred are those compounds having a single aromatic ring or two condensed aromatic rings, or in naphthalene.

The following are illustrative of suitable acids for the production of vanadium complexes for use in this invention: dialkylsalicylic acids, e.g., diisopropylsalicylic acid and 3,5-di-tert.butyl-salicylic acid; dialkyl-p-hydroxybenzoic acids, e.g., ditert.butyl-p-hydroxybenzoic acids and di-n-dodecyl-p-hydroxybenzoic acids; dialkyl-m-hydroxybenzoic acids, e.g., diisopropyl-m-hydroxybenzoic acids; alkyl substituted dihydroxybenzoic acids; naphthalene-2-hydroxy-3-carboxylic acids substituted by alkyl groups, e.g., diisopropyl-2-hydroxynaphthalene-3-carboxylic acid; naphthalene-2-hydroxy-1-carboxylic acids, e.g., diisopropyl-2-hydroxynaphthalene-1-carboxylic acid, and dihydroxynaphthalene carboxylic acids substituted by alkyl groups. Also suitable are the mercapto-analogs of the named hydroxyl-containing compounds, e.g., 2-mercapto-3,5-diisopropyl salicylic acid, diisopropyl-2-mercaptonaphthalene-1-carboxylic acid, etc. The catalysts of this invention are prepared by reaction of acids of the type enumerated with vanadium salts, preferably vanadyl sulfate ($VOSO_4$). Other vanadium(IV) salts may be used, e.g., vanadyl chloride ($VOCl_2$), bromide ($VOBr_2$) or hypophosphite ($VO(H_2PO_2)_2$).

In a typical preparation of a vanadium complex for use according to this invention, vanadyl sulfate and sodium diisopropyl salicylate in a molar ratio of about 1:2 are reacted in an aqueous medium at room temperature. A complex precipitates during the reaction, is separated by filtration, and is then washed three times with water and dissolved in pentane. The pentane solution is briefly shaken 5 times with water and dried by means of molecular sieves. The pentane is distilled off and the residue is vacuum dried for 12 hours at 75° C. The resulting dry solid is ground to a powder. The elemental analysis of the resulting product (oxygen being determined by difference) is

| | Percent by weight |
|---|---|
| V | 6.9 |
| Na | 2.0 |
| C | 62.9 |
| H | 6.8 |
| O | 21.4 |

This corresponds approximately to the formula $$V(OH)_{1/3}(OHa)_{2/3}$$

(diisopropylsalicylate)$_3$. On a sodium free basis, this corresponds approximately to vanadium$^{IV}$monohydroxytri (diisopropylsalicylate) or

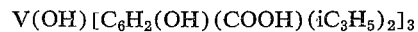

The same compound is prepared in superior yield by employing vanadyl sulfate and sodium diisopropylsalicylate in molar ratios of about 1:3. Higher ratios, e.g., 1:4 and higher may also be used.

The recovered complex vanadium compounds are very soluble in organic solvents, including hydrocarbons, oxygenated hydrocarbons, chlorinated hydrocarbons and the like. They decompose at about 120–130° C.

REDUCING COMPOUNDS

Reducing compounds suitable for use in the catalysts of this invention are those generally useful in Ziegler type catalysts. These are selected from the group consisting of organo-metallic compounds of metals from Groups 1, 2, 3 and 4b of the Mendeleef Periodic Table, as illustrated on page 28 of Ephraim, "Inorganic Chemistry," 6th English Edition. Not all these compounds give identical results. For practical purposes, compounds of aluminum are greatly preferred, but compounds of the following metals may sometimes be desirable:

Group 1—Li, Na, K, Rb, Cs
Group 2—Be, Mg, Ca, Zn, Sr, Cd, Ba, Hg
Group 3—B, Sc, Ga, Y, In, La
Group 4b—Ge, Sn, Pb The term "organo-metallic compound" means a compound in which the metal is directly attached to a carbon atom, but excluding metal carbides. Preferred are those organo-metallic compounds in which a hydrocarbon radical, most preferably an alkyl radical, is attached to the metal. In the case of compounds of polyvalent metals, the remaining valence or valences may be satisfied by hydrocarbon radicals, alkoxy or aryloxy radicals or halogen atoms. Preferred hydrocarbon radicals are alkyl radicals of 2 to 12 carbon atoms, and most preferred those of 2 to 6 carbon atoms. Alkyl chlorides are generally most preferred and alkyl bromides next most preferred.

Particularly preferred are aluminum dialkyl monohalides, aluminum monoalkyl dihalides and aluminum alkyl sesquihalides, most preferably chlorides, next preferably bromides, or mixtures of these aluminum alkyls in various ratios. These preferred aluminum compounds are part of a larger suitable group of the general formula $R_1R_2AlX$ wherein $R_1$ and $R_2$ are similar or dissimilar and each represents a hydrogen atom or a hydrocarbon radical such as an alkyl, alkaryl, aryl, aralkyl, alkenyl, alkylaryl, cycloalkyl or cycloalkenyl radical and X represents a hydrogen atom, a halogen atom, an alkoxy group, or an aryloxy group, or the residue of a secondary amine or an amide, a mercaptan, a thiophenol, a carboxylic acid or a sulfonic acid; or of the general formula $R_1AlX_1X_2$ wherein $R_1$ has the same significance as stated above and $X_1$ and $X_2$ are similar or dissimilar and represent halogen atoms, alkoxy groups or aryloxy groups.

Letting Et=ethyl, Pr=n-propyl, iPr=isopropyl, Bu=n-butyl, iBu=isobutyl and He=n-hexyl, the preferred reducing compounds include $AlEt_2Cl$, $AlEt_{1.5}Cl_{1.5}$, $AlEtCl_2$, $AliPr_2Cl$, $AlPrCl_2$, $AliPr_{1.5}Cl_{1.5}$, $AlBu_2Cl$, $AliBuCl_2$, $AliBu_{1.5}Cl_{1.5}$, $AlHe_2Cl$, $AlEeCl_2$, $AlHe_{1.5}Cl_{1.5}$, $AlEt_2Br$, $AlEt_2I$, $AlEt_{1.5}Br_{1.5}$, and so forth. The person skilled in Ziegler catalysis will be familiar with the useful organo-metallic reducing compounds and will be able to make appropriate selection thereof in the light of this description and the numerous publications in patents, journals and text books.

DILUENTS

Polymerization is preferably carried out in the presence of an organic diluent.

Most preferred as diluents are hydrocarbons, particularly saturated hydrocarbons boiling between about 50° and 250° C. Predominantly aliphatic and/or alicyclic hydrocarbon liquids are generally preferred, but aromatics may also be used. Other useful diluents are chlorinated hydrocarbons, both aliphatic and aromatic, such as dichloroethylene, tetrachloroethylene, orthodichlorobenzene and the like. Suitable hydrocarbon solvents include hexane, isooctane, cyclohexane, gasoline, kerosene, benzene, toluene and the like. The nature of the diluent reaction medium may affect the course of the polymerization, particularly the rate of polymerization. The vanadium complex as well as the reducing organic metal compounds are soluble in such diluents.

CATALYST PREPARATION

The catalyst is prepared by mixing the catalyst-forming components, i.e., the vanadium complex and the reducing compound, in the presence or absence of solid carrier, preferably in the presence of one of said diluents. If desired, the monomer to be polymerized may be present during mixing of the catalyst components, under conditions which favor polymerization, or otherwise. The temperature during preparation of the catalyst is preferably between 0° and 150° C.

The catalyst components can be included in the mixing process either simultaneously or in any sequence. If desired, a considerable time may be allowed to elapse between the times at which the various components are included in the mixing process.

A longer time of interaction of the components or of some components before contact between olefins and catalyst under polymerization condition may, in certain cases, increase the activity of the catalyst and also influence the nature of the polymers to be prepared with the catalyst.

The ratios of the quantities of the catalyst components may vary between wide limits. When aluminum alkyl compounds are employed, the atomic ratio of aluminum to vanadium is as a rule between 1:1 and 20:1, but may be as high as 50:1 or more. Catalyst concentration in the reaction mixture is suitably between 0.1 and 100 millimols of vanadium compound per liter of reaction mixture.

If the catalyst-forming components are mixed in the presence of a liquid organic diluent and polymerization is also carried out in the presence of a diluent, it is preferred to choose the same medium for both phases of the process.

POLYMERIZATION CONDITIONS

Suitable temperatures during polymerization are between −20° and 150° C., preferably between 0° and 70° C. Use of higher and lower temperatures, however, is not precluded.

Suitable pressures, if gaseous monomers are polymerized, lie between 1 and 50 atm. abs. Use of higher or lower pressures is not precluded.

The preparation of the catalyst, as well as the polymerization, according to the invention, can be effected either batchwise or continuously, the latter type of operation if desired in reaction mixtures of constant composition which are kept homogeneous.

PRODUCT RECOVERY

The method of recovering copolymer is conventional. When the desired degree of conversion has been achieved the catalyst is killed by addition of a polar compound, e.g., an alcohol. The polymer, which is generally in solution in the reaction medium, is then coagulated, e.g., by addition of more alcohol, and the coagulated solvent is separated and washed.

Examples 1–4

Two experiments (Examples 1 and 2) were carried out in flasks of 1000 ml. capacity. The flasks were filled with 800 ml. of isooctane and the contents at 50° C. saturated with an ethylene/propylene mixture, the molar ratio of ethylene to propylene being 40:60 and 20:80, respectively. Subsequently 4 millimoles of vanadium complex of diisopropylsalicylic acid (to be referred to sometimes herein as V–DIPS), prepared from vanadyl sulfate ($O=V=SO_4$) and sodium diisopropyl salicylate, as well as 8 millimoles of aluminumisobutyl sesquichloride were added. Thereafter additional ethylene/propylene mixture was passed through each flask with stirring, the temperature being maintained at 60° C. The polymerization which resulted was stopped after 1 hour by addition of ethanol. The copolymers were coagulated by further addition of ethanol. After washing and drying of the products, determinations were made of their intrinsic viscosity (in decalin at 135° C.), the weight percentage of the part soluble in cold hexane, the molar percentage of copolymerized propylene (by means of infrared analysis), as well as the ratio of the viscosity average molecular weight to the number average molecular weight (Mv/Mn). The results of these experiments are listed in Table 1. The data and results of two corresponding experiments, in which V–DIPS was replaced with $VOCl_3$ and VO(O-tert-butyl)$_3$, respectively, are included for comparison.

TABLE 1

| Example No. | Catalyst Components | Al, milliatoms per l. | V, milliatoms per l. | Ethylene/ Propylene, Molar Ratio in Feed | Rate of Polymer Formation, g./l./hr. | Copolymer Properties ||||
|---|---|---|---|---|---|---|---|---|---|
| | | | | | | Intrinsic Viscosity, dl./g. | Soluble in Cold Hexane percent wt. | Propylene Content, percent mol | Mv/Mn |
| 1 | Al$_2$(isobutyl)$_3$Cl$_3$+V–DIPS | 20 | 5 | 40:60 | 32 | 2.9 | 70 | 27 | 1.3 |
| 2 | Al$_2$(isobutyl)$_3$Cl$_3$+V–DIPS | 20 | 5 | 20:80 | 22 | 4.0 | 99 | 34 | 2.6 |
| 3 | Al$_2$(isobutyl)$_3$Cl$_3$+VOCl$_3$ | 20 | 5 | 40:60 | 72 | 2.9 | 99 | 43 | 5.6 |
| 4 | Al$_2$(isobutyl)$_3$Cl$_3$+VO(O-tert-butyl)$_3$ | 30 | 5 | 25:75 | 18.5 | 6.0 | 93 | 34 | 9.5 |

The data in Table 1 illustrate one substantial and outstanding difference between copolymers prepared according to this invention (Examples 1 and 2) and those prepared with prior art catalysts (Examples 3 and 4). This difference is the much lower ratio of Mv/Mn for the copolymers of this invention. This is an indication of a much narrower distribution of molecular weight fractions in the copolymer.

Example 5

Butadiene was polymerized in a manner similar to that described in Examples 1 and 2. 800 ml. benzene was used as solvent. 0.1 millimoles per liter (mmol/l) of V–DIPS and 10 mmol/l of aluminum ethyl sesquichloride (calculated as AlEt$_{1.5}$Cl$_{1.5}$ were added as catalyst. 40 grams of gaseous butadiene were added during a period of two hours while the mixture was held at 5° C. The resulting product was 16 grams of polybutadiene, which analyzed 100% trans-1,4-polybutadiene.

Example 6

Ethylene was copolymerized with dicyclopentadiene in a manner similar to that described in Examples 1 and 2. 800 ml. isooctane was used as solvent and 1 mmol/l of V–DIPS with 7.5 mmol/l AlEt$_2$Cl were used as catalyst. 25 mmols of dicyclopentadiene (2.6 g.) was added to the reaction mixture and ethylene was introduced at the rate of 60 liters per hour during one half hour while the mixture was held at 25° C. 16 g. of copolymer was produced, which proved to be completely insoluble in cold hexane and to have 9 double bonds per 1000 C atoms.

*Example 7*

A terpolymerization of ethylene, propylene and dodecene-1 was carried out in a manner similar to Examples 1 and 2. 800 ml. of isooctane was used as solvent with 10 mmol/l V–DIPS and 40 mmol/l aluminum isobutyl sesquichloride (calculated as AliBu$_{1.5}$Cl$_{1.5}$) added as catalyst. 7.5 ml. of dodecene-1 labeled with C$^{14}$ isotope was added to the solvent. The gaseous feed consisted of a 30:70 mole ratio mixture of ethylene and propylene. The solution was kept saturated with the ethylene-propylene mixture for 1 hour at a temperature of 60° C. In preparing the reaction mixture, dodecene was added at the same time as the V–DIPS and aluminum isobutyl sesquichloride was then added, followed by the ethylene-propylene mixture.

The experiment yielded 17 grams per liter of a terpolymer having an I.V. of 3.0, a cold hexane solubility of 86% wt., and a dodecene content of 25% wt. according to radiographic determination.

*Example 8*

Terpolymerization of ethylene, propylene and butadiene was carried out in a manner similar to Example 7. To 800 ml. of isooctane there was added 2 mmol/l of V–DIPS and 15 mmol/l. of aluminum ethyl sesquichloride as AlEt$_{1.5}$Cl$_{1.5}$. The mixture was held at 5° C. for half an hour during which a 30:70 mole ratio ethylene propylene gas mixture was added in sufficient amount to keep the solution saturated; 1.5 liters of gaseous butadiene was also introduced.

The experiment yielded 15 g./l. of a terpolymer having an I.V. of 1.2 and a cold hexane solubility of 92% wt. Both the soluble and insoluble polymer had a C$_3$ content of 28% mol and 14 double bonds per 1000 carbon atoms as determined by an ozone method.

*Example 9*

A terpolymer of ethylene, propylene and dicyclopentadiene was prepared in a manner similar to Example 7. To 300 ml. isooctane there was added 2 mmol/l. of V–DIPS and 15 mmol/l. of aluminum ethyl sesquichloride as well as 33 mmol/l. of dicyclopentadiene. Ethylene and propylene in a 30:70 mole ratio were added in sufficient amount to keep the isooctane saturated over a period of 1.5 hours while it was held at 20° C. In preparing the reaction mixture dicyclopentadiene was added together with V–DIPS; thereafter aluminum ethyl sesquichloride was added and then the ethylene-propylene gas mixture.

The experiment yielded 33 g./l. of a terpolymer having an I.V. of 2.0 and a cold hexane solubility of 98% wt. It consisted of about 32% mol propylene and about 3% mol dicyclopentadiene according to infrared analysis. The copolymer resulting from this experiment was vulcanized for 1 hour at 150° C. The vulcanization formulation was as follows:

Copolymer _____ 100
HAF carbon black _____ 50
Zinc oxide _____ 5
Stearic acid _____ 1
Tellurium diethyldithiocarbamate _____ 1.5
Tetramethylthiuram disulfide _____ 1
2-mercaptobenzothiozole _____ 1
Sulfur _____ 2

The vulcanized product has a tensile strength of 211 kg./cm.$^2$, elongation at break of 152% and a set at break of 5%.

*Example 10*

A terpolymer of ethylene, propylene and dicyclopentadiene, similar to that of Example 9, was prepared in a manner similar to Example 9 with the following differences. Dichloroethylene was substituted as solvent for isooctane and aluminum isobutylsesquichloride as aluminum compound for aluminum ethyl sesquichloride. The amount of dicyclopentadiene added was 8.25 mmol/l. and the time for addition of ethylene-propylene mixture was ½ hour. The yield was 67 g./l. of copolymer having an I.V. of 2.5, a cold hexane solubility of 91% wt., a propylene content of 30% mol and unsaturation of two double bonds per 1000 C atoms.

*Examples 11–13*

In Examples 11 and 12, mixtures of ethylene, propylene, dicyclopentadiene and dodecene-1 were simultaneously polymerized to produce quaterpolymers. Both runs were carried out at 30° C. and 2 atmospheres absolute in 1000 ml. isooctane, using 0.3 mmol/l. of V–DIPS, 3 mmol/l. aluminum ethyl sesquichloride, 3 mmol/l. aluminum ethyl dichloride and 15 mmol/l. dicyclopentadiene. The amount of dodecene-1 in Example 11 was 6 grams per liter and in Example 12 12 g./l. A gaseous mixture of ethylene and propylene in a mole ratio of 30:70 was introduced at a rate of 200 l./hr. during a residence time of 1 hour.

The quaterpolymers obtained were vulcanized according to the following formulation:

Copolymer _____ 100
HAF carbon black _____ 50
Zinc oxide _____ 5
Stearic acid _____ 1
Tetramethylthiuram disulfide _____ 0.75
2-mercaptobenzothiozole _____ 0.5
Sulfur _____ 1

The properties of the product before and after vulcanization, as well as vulcanization temperature and time, are given in Table 2 together with similar data for the terpolymer prepared under similar conditions without dodecene (Example 13).

TABLE 2

|  | Example 11 | Example 12 | Example 13 |
|---|---|---|---|
| BEFORE VULCANIZATION | | | |
| I.V. | 4.0 | 4.0 | 4.5 |
| Double bonds/1,000 C atoms | 6.0 | 5.5 | 3.5 |
| Cold Hexane solubility, percent wt. | 100 | 100 | 100 |
| DCPD content, percent of DCPD intake | 85 | 80 | 80 |
| C$_{12}''$ content, percent of C$_{12}''$ intake | 25 | 17 | ---------- |
| AFTER VULCANIZATION | | | |
| Vulcanization temp., ° C | 150 \| 145 | 150 \| 145 | 150 \| 145 |
| Vulcanization Time, Min. | 60 \| 30 | 60 \| 30 | 60 \| 30 |
| Tensile strength, kg./cm.$^2$ | 245 \| 234 | 248 \| 200 | 224 \| 216 |
| Elongation at break, percent | 250 \| 294 | 251 \| 336 | 285 \| 378 |
| Modulus 200% | 151 \| 109 | 150 \| 86 | 102 \| 84 |
| Modulus 300% | ---------- | 162 | 152 |
| Set at break percent | 6 \| 12 | 7 \| 16 | 8 \| 17 |

*Example 14*

This example illustrates one of the outstanding advantages of the present invention. It has been found that by varying the type and proportion of aluminum alkyl compounds used as co-catalyst with vanadium complexes according to this invention close control of the molecular weight of the resulting copolymers can be obtained, particularly in polymerizations in which three or more comonomers are polymerized simultaneously. This is an important aspect of this invention because molecular weight control is a necessary feature for commercial utilization of polymerization catalyst.

The data in Table 3 illustrate variations in I.V. of the product which were obtained in an experiment similar to Example 9, in which a 30/70 mole ratio mixture of ethylene and propylene was added to a reaction mixture containing 0.2 mmol/l. V–DIPS as catalyst and 50 mmol/l. of dicyclopentane in isooctane, the reaction being carried out for a period of 1 hour at 30° C. and at 2 atmospheres absolute pressure.

TABLE 3

| AlEtCl$_2$ | AlEt$_{1.5}$Cl$_{1.5}$ | AlEt$_2$Cl | Rate, g./l./hr. | Hexane Soluble, percent w. | C$_3$, percent M | I.V. | Double Bonds/1,000 C Atoms | | |
|---|---|---|---|---|---|---|---|---|---|
| | | | | | | | Theor. Possible | Ozone Method | Percent of Theor. |
| ---------- | ---------- | 5.0 | 3.5 | 99+ | ---------- | 0.9 | 67.7 | 10.4 | 15 |
| ---------- | 1.0 | 4.0 | 7.0 | 99+ | 30 | 1.3 | 30.0 | 9.1 | 30 |
| ---------- | 2.5 | 2.5 | 11.2 | 99+ | 31 | 1.8 | 18.8 | 6.9 | 37 |
| ---------- | 4.0 | 1.0 | 16.5 | 99+ | 34 | 2.5 | 12.7 | 5.5 | 43 |
| ---------- | 5.0 | ---------- | 15.0 | 99+ | 35 | 2.7 | 14.0 | 7.5 | 54 |
| 1.0 | 4.0 | ---------- | 16.5 | 99+ | 33 | 3.3 | 12.7 | 6.7 | 53 |
| 2.5 | 2.5 | ---------- | 20.0 | 99+ | 36 | 4.5 | 10.5 | 5.9 | 56 |
| 4.0 | 1.0 | ---------- | 16.0 | 99+ | 33 | 3.2 | 13.1 | 6.1 | 46 |
| 5.0 | ---------- | ---------- | 16.0 | 99+ | 38 | 2.6 | 13.1 | 6.5 | 50 |

*Example 15*

The influence of DCPD concentration in feed, using 0.3 mmol/l. V–DIPS and a mixture of 3 mmol/l. AlEt$_{1.5}$Cl$_{1.5}$ and 3 mmol/l. AlEt$_2$Cl, other conditions being the same as in the foregoing terpolymer, is shown in Table 4.

TABLE 4

| DCPD, mmol./l. | Rate, g./l./hr. | Double Bonds/1,000 C Atoms | | | Hexane Soluble, Percent w. | C$_3$, Percent Mol | I.V. |
|---|---|---|---|---|---|---|---|
| | | Theor. Possible | Ozone Method | Percent of Theor. | | | |
| 22 | 9.3 | 33.0 | 13.8 | 42 | 99 | 29 | 1.1 |
| 20 | 11.8 | 23.7 | 12.8 | 54 | ---------- | ---------- | 1.2 |
| 18 | 11.3 | 22.3 | 12.0 | 54 | ---------- | ---------- | 1.4 |
| 16 | 12.2 | 18.3 | 10.4 | 57 | ---------- | 29 | 1.7 |
| 13.9 | 10.1 | 19.2 | 11.5 | 60 | ---------- | ---------- | 1.2 |
| 11 | 14.0 | 11.0 | 7.6 | 69 | 99 | 32 | 1.7 |

We claim as our invention:

1. A process for the polymerization of olefinically unsaturated hydrocarbons comprising contacting
   (a) a polymerization feed selected from the group consisting of
      (1) butadiene,
      (2) mixtures of two to four alpha-monoolefins wherein each monoolefin is present in a concentration of at least 0.5 mole percent, and
      (3) mixtures of two to three alpha-monoolefins with one hydrocarbon having at least two olefinic double bonds per molecule, wherein said latter hydrocarbon is present in a concentration which results in a product containing from 0.5 to about 5 mole percent thereof and each monoolefin is present in a concentration of at least 0.5 mole percent,
   (b) dissolved in an organic diluent, with
   (c) a catalyst comprising
      (1) an organometallic reducing compound of aluminum, and
      (2) a hydrocarbon soluble vanadium complex resulting from reacting in aqueous solution an inorganic vanadyl salt and an alkali salt of an aromatic carboxylic acid substituted on the same aromatic ring with at least one carboxyl group, at least one alkyl group, and at least one group —XH where X is selected from the group consisting of sulfur and oxygen.

2. A process for the polymerization of olefinically unsaturated hydrocarbons comprising contacting
   (a) a polymerization feed selected from the group consisting of
      (1) butadiene,
      (2) mixtures of two to four alpha-monoolefins of 2 to 16 carbon atoms per molecule wherein each monoolefin is present in a concentration of at least 0.5 mole percent,
      (3) mixtures of two to three alpha-monoolefins of 2 to 16 carbon atoms per molecule with a diolefin of 4 to 18 carbon atoms per molecule, wherein said diolefin is present in a concentration which results in a product containing from 0.5 to about 5 mole percent combined diolefin and each monoolefin is present in a concentration of at least 0.5 mole percent,
   (b) dissolved in a hydrocarbon diluent, with
   (c) a catalyst comprising
      (1) an aluminum alkyl halide and
      (2) a hydrocarbon soluble vanadium complex resulting from reacting in aqueous solution an inorganic vanadyl salt with an alkali metal salt of a monocyclic aromatic carboxylic acid having as ring substituents at least one carboxyl group, at least one hydroxyl group, and at least one alkyl group of from 1 to 12 carbon atoms.

3. A process according to claim 11 wherein said polymerization feed consists of ethylene and propylene.

4. A process according to claim 11 wherein said polymerization feed consists of butadiene.

5. A process according to claim 11 wherein said polymerization feed comprises butadiene in admixture with at least one alpha monoolefin.

6. A process according to claim 11 wherein said polymerization feed comprises dicyclopentadiene in admixture with at least one alpha monoolefin.

7. A process according to claim 11 wherein said vanadium complex is the product of reacting in aqueous solution a vanadyl salt with an alkali metal salt of a monocyclic aromatic carboxylic acid having as ring substituents a carboxyl group, a hydroxyl group and two alkyl groups of 2 to 6 carbon atoms, each.

8. A process according to claim 11 wherein said vanadium complex is the product of reacting in aqueous solution vanadyl sulfate with an alkali metal salt of a dialkylsalicylic acid.

9. A process for the copolymerization of ethylene, propylene, and dicyclopentadiene which comprises introducing
   (a) a vapor phase polymerization feed consisting of a minor proportion of ethylene and a major proportion of propylene into
(b) a liquid paraffinic hydrocarbon diluent containing in solution an aluminum alkyl chloride
(c) dicyclopentadiene and
(d) the product of reacting in aqueous solution vanadyl sulfate and sodium diisopropylsalicylate.

10. A process according to claim 8 wherein said reaction product of vanadyl sulfate and sodium diisopropylsalicylate is the result of reacting said vanadyl and sodium salts, in a molar ratio of from 1:2 to 1:4, in an aqueous medium at room temperature.

References Cited by the Examiner

UNITED STATES PATENTS

| | | | |
|---|---|---|---|
| 2,699,457 | 1/1955 | Ziegler et al. | 260—88.2 |
| 2,843,577 | 7/1958 | Friedlander et al. | 260—94.9 |
| 2,962,451 | 11/1960 | Schreyer | 260—94.9 |
| 3,057,894 | 10/1962 | Robinson | 260—429 |
| 3,062,803 | 11/1962 | Farnham et al. | 260—94.9 |
| 3,064,022 | 11/1962 | Jolly | 260—429 |

JOSEPH L. SCHOFER, *Primary Examiner.*

M. LIEBERMAN, W. H. SHORT, *Examiners.*